May 22, 1951 F. B. LLEWELLYN Re. 23,369

DIODE OSCILLATOR

Original Filed July 31, 1937 4 Sheets-Sheet 1

INVENTOR
F. B. LLEWELLYN
BY Guy T. Morris
ATTORNEY

INVENTOR
F.B.LLEWELLYN
BY Guy T. Morris
ATTORNEY

May 22, 1951 F. B. LLEWELLYN Re. 23,369

DIODE OSCILLATOR

Original Filed July 31, 1937 4 Sheets-Sheet 3

INVENTOR
F. B. LLEWELLYN
BY Guy T. Morris
ATTORNEY

May 22, 1951 F. B. LLEWELLYN Re. 23,369

DIODE OSCILLATOR

Original Filed July 31, 1937 4 Sheets-Sheet 4

INVENTOR
F. B. LLEWELLYN
BY Guy T. Morris
ATTORNEY

Reissued May 22, 1951 Re. 23,369

UNITED STATES PATENT OFFICE 23,369

DIODE OSCILLATOR

Frederick B. Llewellyn, Summit, N. J., assignor to Bell Telephone Laboratories, Incorporated, New York, N. Y., a corporation of New York Original No. 2,190,668, dated February 20, 1940, Serial No. 156,647, July 31, 1937. Application for reissue February 19, 1942, Serial No. 431,607

65 Claims. (Cl. 315—6)

Matter enclosed in heavy brackets [ ] appears in the original patent but forms no part of this reissue specification; matter printed in italics indicates the additions made by reissue.

*This invention relates to electronic devices where the* [This invention relates to oscillators where the] wave-lengths contemplated may be as short as 10 centimeters and under when desired, therefore extending to a wave-length range in which, before the advent of the principle here utilized, it has been impracticable to operate. More specifically, the invention relates to what are known in the ultra-short wave art as "diode oscillators" and therefore to the configuration of two electrodes in an evacuated space and the relative mechanical and electrical design of an associated resonating system whereby the organization as a whole is adapted to generate stable waves of the type above indicated.

It is believed that applicant's invention illustrates a maturity of development of diode oscillators not heretofore approximated in the art. The uniqueness and distinctive character of his invention results from his having been able to combine an electron discharge with low-loss circuit configurations and to analyze the prior art circuits and provide quantitative electrical and mechanical dimensions, configurations, etc., as above, so as to be able to predetermine the characteristics of operation of his oscillator.

Accordingly, the principal object of the invention is to provide a stable frequency oscillator capable of generating waves of the order of 10 centimeters and less long.

Subsidiary objects of the invention are to improve the operational characteristics of pre-existing diode oscillators to the extent of providing greater frequency stability, increased energy output and better modulation, and to improve their structures in the interest of increased facility of manufacture, longer life, and adaptability, by extension of the principle to variant alternative forms, to a greater variety of uses.

*The invention in one aspect contemplates the use of a chamber or cavity resonator excited to set up standing electromagnetic waves of a kind and frequency responsive to the physical configuration of the resonator together with means for causing an electron beam to traverse at least a part of said resonator so as to cause a coaction between said beam and the electric field of said standing waves.*

The order of wave-length within the contemplation of the present invention is such as effectively to annul the operation of the regenerative principle on which most electron discharge oscillators have depended in the past. Neither is the ultra-short wave diode principle analogous to that underlying the operation of negative resistances of the common arc, or the ionized discharge, or the secondary emission type, nor may such prior art types of negative resistance be utilized for the short-wave lengths here in mind. Still further, the principle of the invention is not strictly comparable even with those of the so-called Barkhausen and magnetron oscillators or their variants and derivatives although such types of oscillators perhaps most nearly approximate that of the invention as to order of wave-lengths generated. In a certain aspect of the invention, a diode oscillator of the invention could be thought of as the end product of a radical evolution beginning with the Barkhausen oscillator and involving an avoidance of the usual negative plate thereof and a violent reorganization of the resultant two electrodes and the electrical and mechanical dimensions of their immediately associated structures.

More specifically, the diode oscillator of the invention, in one aspect here given priority of description as possibly being the simplest and most easily understandable, comprises two electrodes in an evacuated space, the negative resistance imputed to the space therebetween being a function of certain precise conditions affecting the electrodes. For instance, there must be a uniform flow of electrons from one such electrode, which simulates to that extent the function of the usual electron tube cathode, to the other electrode on which a positive potential is impressed relatively to the cathode in order to promote this flow, said positive electrode therefore simulating the usual electron tube anode. The requisite uniformity of electron flow requires practically that the emitting surface of the cathode be smooth and relatively extensive as distinguished from, for example, a small filamentary cathode associated with a planar anode. This ultimately means that the cathode must have a shape of the same type as that of the anode, both constituting regular, smooth, relatively flat surfaces. To promote further the uniform flow, the anode surface should be very closely equidistant at all points from that of the cathode, that is, the two surfaces should be uniformly spaced.

Concomitantly with the above purely structural requisites there must be the condition, brought about by the appropriate relative design of said structure and the potentials applied thereto, that the transit time of the electrons between the two electrodes is approximaely 5, 9, 13, 17, etc., quarter-cycles of the high frequency current which it is intended to produce.

A negative resistance being provided by the satisfaction of the above considerations, a self-contained, or self-excited oscillator results from the further extension of the principle to the design of a cooperating external circuit and structure. For instance, the interelectrode space, above cited as the negative resistance, strictly partakes of the electrical characteristics of a circuit constituted by a negative resistance and a capacitance in series; therefore, the perpetuation of the oscillations implied by the negative resistance, per se, requires that this capacitance be constituted a part of a series resonant circuit the resistance of which, that is, the postive resistance of which is less than the negative resistance imputed to the electrode space.

The consummation of the invention, therefore, results from the design of an inductive reactance so electrically dimensioned as to resonate with the interelectrode capacitance and which is almost wholly devoid of resistance. The inductor of said reactance, because of this necessary condition, that is, because of its very high ratio of reactance to resistance at the oscillation frequency which ratio is sometimes denominated "Q," tends to be very distinctive not only in its design but also in its physical appearance.

In another aspect of the invention, the diode oscillator comprises the same elements which were enumerated above, but with the further feature that the so-called cathode need not be an emitter of electrons in the usual sense, but may contain an opening, or openings through which electrons are impelled under the influence of outside forces to enter the space between cathode and anode and proceed toward the latter, where they either are collected or allowed to exit through an opening, or openings corresponding to those in the cathode, whereupon they ultimately are collected by an electrode biased to a relatively low positive potential with respect to the original source of the electrons. In this aspect of the invention, it is merely required that the flow of electrons between the cathode and anode surfaces be of the uniform nature stated in connection with the more restricted form of the invention described above. In this broader form, the cathode and anode potentials need not differ from each other and in fact the two surfaces may form part of the bounding walls of an enclosed conducting cavity so dimensioned as to possess an electrical resonance at the operating frequency, and having holes or openings in opposing faces of the bounding walls to allow the electron stream to enter and leave the cavity. The electron stream is accelerated and directed through the openings in the resonant cavity by means of an electron gun consisting of any of the well-known configurations.

In the broadest aspect of the invention, an electron stream flows through an evacuated region in a conducting cavity which is resonant at the [desired frequency, and the electron speed is such] *desired frequency, and in its application to diode oscillators the electron speed is such* that the time which is required for the electrons to traverse the cavity is approximately 1¼, 2¼, 3¼, etc., cycles. Modulation of the oscillations produced is accomplished by varying this transit time by means of a change either in the potentials applied to the cavity or to an electron gun used externally to the cavity for the purpose of directing the electron stream through the cavity.

The invention may be exemplified in other widely variant forms all of which, of course, illustrate the necessary conditions above pointed out. For instance, the electrodes or cavity surfaces may be either cylindrical or plane, especially since, with a sufficiently small relative gap, cylindrical electrodes may simulate, as a matter of theory, the prototype plane electrodes. In the cylindrical electrode type the cathode may be either internal or external to the anode, with certain resultant differentiations as to utility and characteristics of operation. In order to promote the provision of the optimum electrical dimensions of the compensating inductance, this inductance may effectively be constituted by a Lecher wire structure, somewhat analogously to the provision of a like means in the prior art relating to high frequency oscillators, the significant characteristic of a Lecher wire system as distinguished from a more conventional resonant circuit being the promotion of the standing wave phenomenon. Furthermore, a wave guide means may be used either in substitution for the Lecher wire system or in addition thereto in furtherance of the derivation of a maximum amount of power from the oscillator, and with a maximum of efficiency. The wave guide as it will be disclosed herein differs essentially from a Lecher wire system or any conventional transmission system. It is not original, per se, with applicant.

Features of the invention, not above pointed out, or at least not above pointed out in adequate terms, which distinguish diode oscillators, as the term is here used, from other types of prior art oscillators, as well as from prior art diode oscillators, follow: Applicant teaches a system of quantitative analysis whereby the oscillation conditions may be predetermined and specified in detail; his invention contemplates that a considerable degree of choice may be exercised as to the relationship between transit time and cycle time, within the limits set forth above, that is, second and higher mode oscillations as distinguished by the use of 9, 13, etc., quarter-cycles, as above, instead of 5 quarter-cycles may be used, the choice of mode of course, being a measure of the order of the wave-length of the wave generated; his invention evinces the recognition of the importance of radiation resistance and particular ideas of means for reducing it (this feature having a close relation to the use of resonant cavities, wave guides, and the like above mentioned); and the invention recognizes that complete space charge is not essential for the production of oscillations, contrary to the teachings of the prior art of diode oscillators, "space charge" of course having the meaning here as in the prior art of vacuum tubes generally as expressing the electronic conditions in the space between the electrodes. At frequencies far removed from those where the electron transit time is 5, 9, 13, 17, etc., quarter-cycles, as specified above, the diode displays no negative resistance. Thus at all lower frequencies, no oscillations are possible.

Other features of the invention are illustrated in the accompanying drawings in which:

Fig. 1 illustrates, partially diagrammatically and in section, a simple, but effective, embodiment of the principle of the invention in a diode oscillator of the plane electrode type including modulating means, this illustration also having been selected as the basis for the analytical treatment of the invention as a whole and as applicable to the other modified forms as well;

Fig. 2 comprises a simple graphical device for aid in an understanding of the analytical treatment of the invention;

Fig. 3 includes certain graphical representations of the characteristics of a diode oscillator to illustrate the analytical treatment;

Figure 9:
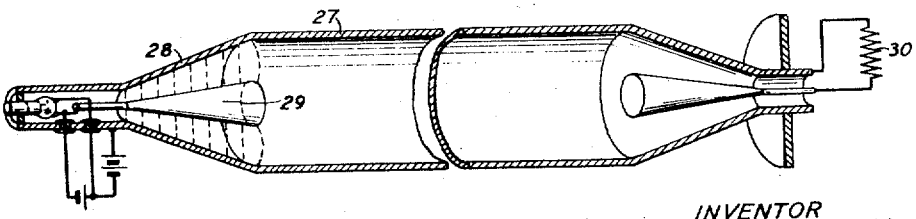
Figure 8:
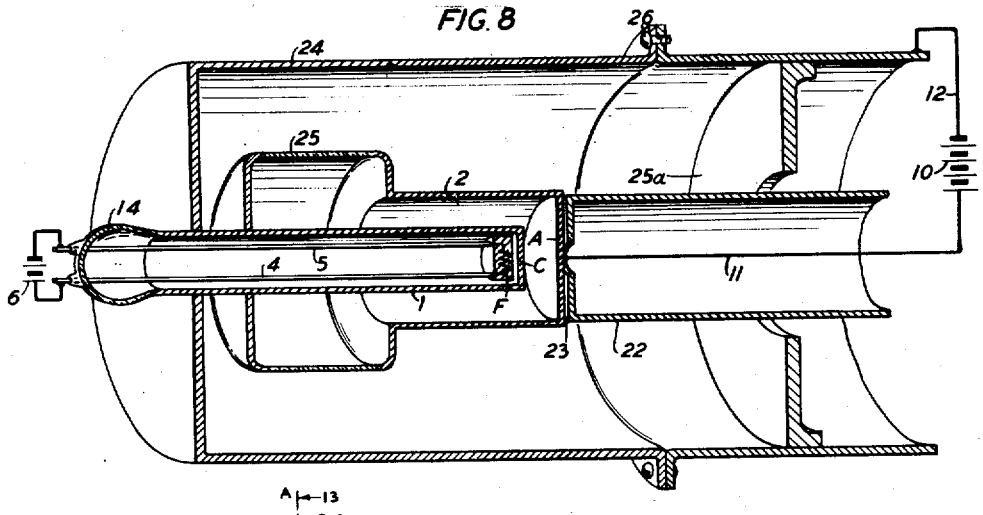
Fig. 8 illustrates one mode of coupling a diode oscillator, here incidentally shown as of the plane electrode type, to a concentric conductor transmission line, as a means for increasing the output energy and stabilizing the operational characteristics.

Fig. 9 is similar to Fig. 8, differing principally therefrom as illustrating the utility of a wave guide, as distinguished from the concentric conductor transmission line or other type of transmission line, in coupled relation to a diode oscillator, the particular type of diode oscillator not being of significance, similarly as in the instance of Fig. 8; and Figs. 10 to 14 illustrate various alternative forms (in one instance, the form employing more than one figure) of diode oscillator, especially of the concentric electrode type, as adapted for the condition of a finite, as distinguished from a zero, initial electron velocity and acceleration, this requiring certain accessory ciruits and structure not required in the forms of the invention illustrated by the earlier numbered figures which presume an initial zero electron velocity and acceleration.

Figure 1:
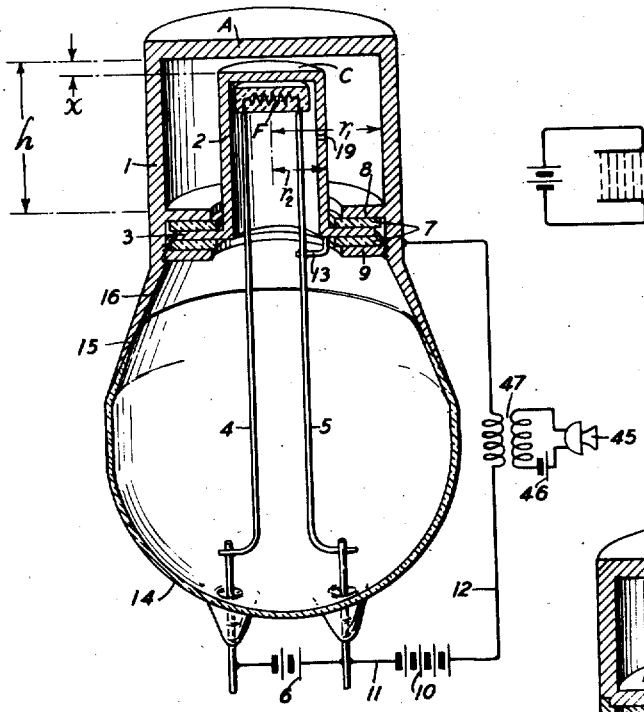

As a preliminary to a detailed disclosure of the electrical and structural features of the various modified forms of the invention, it is proposed to disclose in connection with the modified form illustrated by Fig. 1, which is perhaps the simplest of the modifications, the mode of analytical treatment applicable generally to all forms, whether of the plane electrode or cylindrical electrode, of the generic invention, although applicable in the full detail used only to the Fig. 1 form. In referring to other species than that illustrated by Fig. 1, where deemed pertinent, a further analysis will be included at the proper place. This treatment as a whole provides the basis for the teachings herein of the various claimable features of the invention, enabling a person normally skilled in the art to achieve the practical forms of the invention disclosed and particularly to predetermine the electrical and structural dimensions of a diode oscillator to satisfy a given desired operational characteristic.

Figure 2:
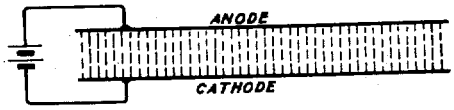

It has been found that a uniform stream of electrons moving between two equidistant surfaces, as is illustrated diagrammatically in Fig. 2, exhibits the property of negative resistance within a series of high frequency bands. This property has been used, by applicant, for the production of oscillations at a wave-length of the order of 10 centimeters and is suitable for the production of considerably shorter or longer waves.

Referring to Fig. 1, the coaxial conductors 1 and 2 whose lengths and diameters are small as compared with the wave-length of the desired resultant oscillations are closed at one end by the annular ring or flange 3 and are terminated at the other end by the disc members C and A. These disc members constitute the diode electrodes. Between these diode electrodes there is, of course, a capacitance the value of which is determined by the dimensions and spacing of the electrodes and, as will be shown, there also exists therebetween under critical environmental conditions of circuits and structure a negative resistance, this of course implying the possibility of developing oscillations.

The electron discharge, on which all of the diode oscillator functions are presupposed, takes place between these disc elements C and A. In Fig. 1 the element C constitutes an electron emitter and the other element A is biased at a positive potential relative thereto. That is, disc element C is the cathode and disc element A is the anode, as is indicated by their literal designations although the converse could be true. The cathode C is coated with a material processed in a well-known manner to produce a copious emission of electrons when heated to emitting temperature by filament F fixed in close contiguity to the cathode in, for example, a ceramic mounting. The filament is energized through leads 4 and 5 from source 6. It should be noted that in the converse relation where the exterior electrode would be the cathode and the interior electrode the anode, care should be taken that electrons are emitted only from the portion of the cathode that is opposite to the anode as otherwise a large number of stray electrons would tend to produce a non-uniform discharge which would tend to affect the stability of the operation and induce temperature effects which would have the character of wastage of energy. The closure element 3, while closing the end of the coaxial conductor system with relation to the emission of large radiation and stray fields, is conductively separated from the conductor 1, which is effectively an extension of the anode A, by ceramic or the like annular elements 7 engaged between the shoulder or flange 8 of conductor 1 and the screw-threaded adjustable conducting ring 9, these elements 8 and 9 being effectively extensions of the conductor 1. Because of the conductive separation, that is, insulation, at this point a direct current difference of potential may be applied between the two sections of the imputed resonant circuit or cavity comprising the two coaxial conductors and the diode electrodes, and therefore between the cathode and anode, as by the source 10 and leads 11 and 12, the positive terminus of the source 10 being thus effectively connected to the anode 8 through the secondary winding of the transformer 47, to be described presently. The circuit is completed by the connection 13 between the filament lead and the coaxial conductor 2 whereby the cathode C is placed at the potential of the filament.

In order that the electron discharge may occur in an evacuated space, which is a requisite, the physical structure as a whole, as has already been described, is sealed to the evacuated glass or like member 14 by a hermetic joint, or seal, at the neighborhood 15 between said bulb or container and the flange-like extension 16 of the coaxial conductor 1, and evacuated by a pump acting through a tubulation which may be attached to the bulb and afterwards sealed off. A small hole 19 in the surface of the inner cylinder 2 allows evacuation to occur within the resonant cavity between the cylinders 1 and 2.

It will be appreciated that the above recited smallness of the dimensions of the coaxial system as compared with the oscillation wave-length has been assumed solely for the purpose of simplifying the significance of the design formulas to be given and that structures whose dimensions are not small as compared with the wave-length may be employed satisfactorily consistently with design formulas which are longer than the ones to be given, but which may be derived readily therefrom by those skilled in the art by the use of well-known methods. For example, reference may be given for such an elaboration of the design analysis to paper by S. A. Schelkunoff in the Bell System Technical Journal for October 1934 and to a paper by Carson, Mead and Schelkunoff in the April 1936 issue of the same Journal. Incidentally, a more complete mathematical analysis by applicant of the operation of vacuum tubes at ultra-high frequency, comprehending the diode oscillator principle, than is to be contained in the present specification, or as is required to be contained therein, may be found in his paper "Operation of ultra-high-frequency vacuum tubes" in the October 1935 issue of the Bell System Technical Journal, this paper being based upon, but carrying forward the analysis as in accordance with a more mature conception of, his paper "Vacuum tube electronics at ultra-high frequencies" in the January 1934 issue of the same Journal.

The general method of attack in the development of a diode within which a negative resistance occurs, and the relative development of associated circuits and structure so as to perpetuate the oscillations implied by the negative resistance involves, as a first step, the finding of the power generated by the negative resistance, assuming an arbitrary magnitude for the high frequency current through it, and then the computing of the power dissipated in all of the positive resistances of the system by the currents flowing through them. For the production of oscillations this latter power must, of course, be less than the former. There are other necessary conditions and necessary steps in the development.

As applied to the simple diode of Fig. 1, the method requires first a computation of the relation required to tune the system to the desired frequency, remembering that the system, that is, the imputed resonant circuit, is made up of the capacitance of the diode and the distributed inductance and capacitance of the remainder of the circuit as including the coaxial conductors 1 and 2. For practical purposes, that is, for purposes of this computation, the slight variance from a perfect conductive closure at the cathode end of the coaxial conductor system, may be disregarding and is here disregarded. The formula expressing this tuning relation is as follows:

$$h=\frac{\lambda^2 x}{2\pi^2 r_2^2 \log_e \frac{r_1}{r_2}} \qquad (1)$$

in which $\lambda$ is, of course, the free-space wave-length of the desired oscillations and in which the other quantities, except numerics, are physical dimensions which are indicated on Fig. 1 and of which h is the inside length and $r_1$ and $r_2$ are respectively the inner radius of the outside coaxial conductor and the outer radius of the inside coaxial conductor and x is the gap between the diode electrodes. In this equation all of the dimensions are in centimeters. This equation is distinctive only as containing expressions for the inductance and capacitance of a resonant circuit where the inductance, because of extreme conditions assumed, has a form which is perhaps unconventional from the viewpoint of those concerned with the more commonly used frequencies. However, as in the instances of any other inductors and capacitors, the inductance and capacitance herein are functions of the geometry of these structures and there is nothing new in the computation.

The power generated by the electron stream may be calculated from the general formula for the resistance per square centimeter of a uniform discharge of electrons. This resistance is $$r_D=\frac{1.78\lambda^4 I_0}{10^4}[2(1-\cos\theta)-\theta\sin\theta] \qquad (2)$$

in which $I_0$ is the value in amperes of the direct current component flowing through a square centimeter of area, $\lambda$ is the free-space wave-length in centimeters, and $\theta$ is the transit angle of the electrons in radians. This transit angle is allied with what is denominated "transit time" and is a measure, in radians, of the fraction of a cycle, or number of cycles of alternating current required for the electrons to travel from the cathode to the anode in the absence of oscillations. It is given by the equation $$\theta=\frac{Ax}{\lambda\sqrt{V_0}} \qquad (3)$$

where $V_0$ is the direct potential bias of the anode resulting from the source 10 and A depends on the space charge, being 6300 for the case where there is no space charge and 9500 for a complete space charge with intermediate values for partial space charge. The fact that electrons start with a small, but finite, initial velocity, rather than a zero velocity, causes the actual transit angle to be slightly less than would be given by Equation 3 above but the correction may be disregarded except where the design tolerance is very small. In such cases, the more exact formula for transit angle may be derived very simply from the analysis in applicant's paper in the October 1935 issue of the Bell System Technical Journal, above identified, especially from Equation 10 therein.

The Equation 2, expressing the relation between the alternating current resistance and the transit angle, may be changed to the form $$r_D=\frac{12r_o}{\theta^4}[2(1-\cos\theta)-\theta\sin\theta] \qquad (4)$$

in which $r_o$ is the low frequency series resistance. With complete space charge $r_o$ is the slope of the static characteristic derived from the well-known Child's equation $$I_0=\frac{2.33}{10^6}\frac{V_0^{3/2}}{x^2} \text{ amperes per square centimeter} \qquad (5)$$

so that $$r_o=\frac{2}{3}\frac{V_0}{I_0}$$

but more generally is given by $$r_o=\frac{1.48}{10^5}I_0\frac{x^4}{V_0^2}A^4$$

where A is defined in Equation 3. The equation in this form (4) is plotted graphically in Fig. 3 which is a replica of the like identified curve in Fig. 1 of applicant's paper, above identified, in the January 1934 issue of the Bell System Technical Journal. Equation 4, and its graph in Fig. 3 are significant as showing definite regions where the resistance is negative, this of course implying the possibility of oscillations.

Figure 3:
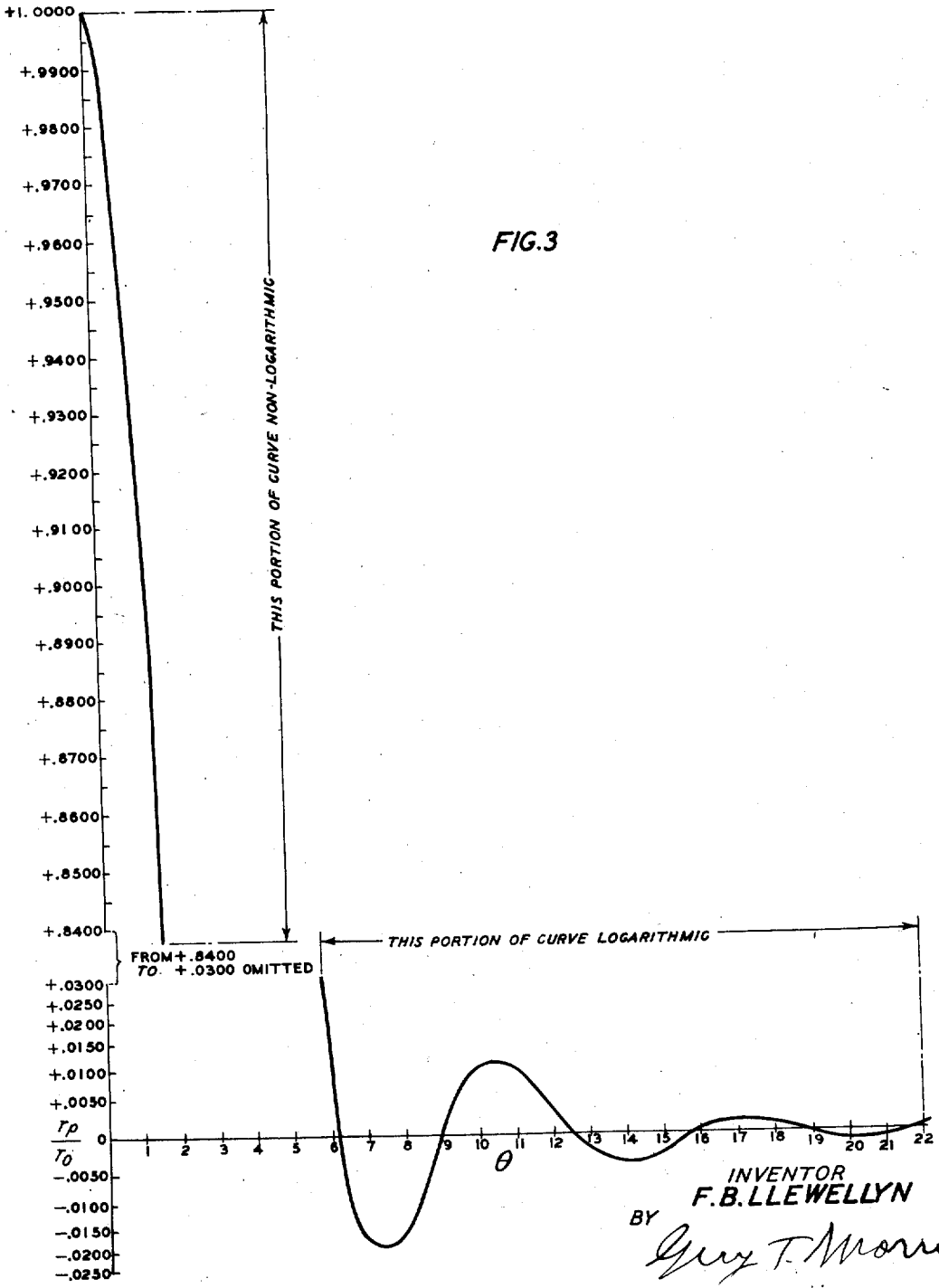

Investigation of Equation 4 and examination of Fig. 3 show that the greatest values of the negative resistance occur when the transit angle is approximately $$2\pi n+\frac{\pi}{2}$$

where n is either 1, 2, 3, etc., that is, where the transit angle is 5, 9, 13, etc., quarter-cycles of the wave to be generated, and that each of the negative and positive portions (loops) of the curve extend through an interval of $\pi$ radians, the negative portions, for example, occurring in the range $\theta=2\pi$ to $3\pi$, $4\pi$ to $5\pi$, $6\pi$ to $7\pi$, etc. It should also be noted that the maximum of successive loops progressively decreases with increase in $\theta$. The cyclical recurrence of the negative resistance with increasing $\theta$ is the reason for the attribution in the statement of invention of the capability of applicant's invention to utilize second and higher mode oscillations, the "mode" of oscillation being identified by the value of n. Of course, where n is relatively large, so that the order is large, the frequency of the generated wave is in like proportion.

Equation 2 may be expressed in greatly simplified form, with certain very close approximations, for the condition of maximum negative resistance, that is, when $$\theta=2\pi n+\frac{\pi}{2}$$

produced by the electrons over the entire cross-section $$\pi r_2^2$$

by the equation $$R_p=\frac{-1.4\lambda^4 I_0 10^{-3}}{\pi r_2^2}\left(\frac{4n+1}{5}\right) \qquad (6)$$

To design a diode oscillator for a particular frequency, the first step is to decide what current density $I_0$ can safely be tolerated with the type of thermionic emitter which it is planned to use. It may be stated at this place that emission may be increased by use of any one of the various coating materials that are common in the art of thermionic electron tubes, this coating, which may be applied directly to the face of the diode opposed to the anode, also making possible the effective limitation or conformation of the electron emitting surface, and therefore the effective portion of the surface, of the cathode.

This first step having been accomplished, the value of x which will yield convenient values for $V_0$ with the smallest value for n in the above equation $$\theta=2\pi n+\frac{\pi}{2}$$

expressing the transit angle for the conditions when the resistance is negative, may be computed from Equations 3 and 5, using the value 9500 for A in Equation 3 corresponding to complete space charge. This complete space charge condition gives the lowest voltage which will permit the allowable current to flow from the cathode, and hence is desirable as decreasing the input power to the diode. This completes the design of the electronic portion of the diode, the negative resistance being computed from Equation 6.

The remainder of the resonant circuit must be proportioned so as to resonate at the given frequency or wave-length, and therefore, must satisfy Equation 1. Further, it must be constructed so that the sum of all of the resistances external to the negative resistance of the electronic path, as expressed by Equation 6 is less than the magnitude of said negative resistance, it being assumed that such external resistances are positive rather than negative, and that the same current flows through all of them, this latter being a consequence of the restriction that the circuit dimensions are small compared with the free-space oscillation wave-length. In a more general sense, the power dissipated in each resistance is computed in accord with the current flowing through it and the sum thus found must be less than the power generated by the current flowing through the negative resistance of the diode. The following formulas give the various circuit resistances for Fig. 1, where $\mu$ is the relative permeability and $\sigma$ the relative resistivity of the material used, at a temperature of 20° C. and referred to copper whose resistivity is taken at $1.724\times10^{-6}$ ohms in a centimeter cube.

The outer cylinder 1

$$R_1=\frac{0.0073h}{r_1}\sqrt{\frac{\mu\sigma}{\lambda}}=\frac{0.000369\sqrt{\mu\sigma}\lambda^{3/2}x}{r_1 r_2^2 \log_e \frac{r_1}{r_2}} \qquad (7)$$

The inner cylinder 2

$$R_2=\frac{0.0073h}{r_2}\sqrt{\frac{\mu\sigma}{\lambda}}=\frac{0.000369\sqrt{\mu\sigma}\lambda^{3/2}}{r_2^3 \log_e \frac{r_1}{r_2}} \qquad (8)$$

The flat end of the inner cylinder, that is, the cathode in the particular arrangement illustrated in Fig. 1.

$$R_5=0.0018\sqrt{\frac{\mu\sigma}{\lambda}} \qquad (9)$$

The annular ring 3

$$R_3=0.0073\sqrt{\frac{\mu\sigma}{\lambda}}\log_e\frac{r_1}{r_2} \qquad (10)$$

The flat end of the outer cylinder, that is, the anode in the particular arrangement illustrated in Fig. 1 (note that only a portion of this end, however, functions effectively as an anode).

$$R_4=0.0018\sqrt{\frac{\mu_1\sigma_1}{\lambda}}+0.0073\sqrt{\frac{\mu_2\sigma_2}{\lambda}}\log_e\frac{r_1}{r_2} \qquad (11)$$

In Equation 11 the expression $\mu_1\sigma_1$ refers to the portion of the surface of the anode which opposes the cathode, consistently with the above statement as to the effective portion of the surface as an anode, while the expression $\mu_2\sigma_2$ refers to the remaining part of this surface. The distinction is made use of in this equation, however, not merely because electrons flow to a portion only of the surface in question, but because of a difference in operating temperature resulting therefrom, this, of course, making a corresponding change in the resistivity. In most materials when $\lambda$ is of the order of 10 centimeters, the relative permeability may be taken as unity.

At the junction of the two cylinders in the neighborhood of the ring member 3, across which the biasing potential $V_0$ is applied, there will tend to be a radiation of energy which causes a resistive component to be introduced into the resonant cavity, the component resistances of which are indicated in the above equations. The ultra-high frequency diode is a low impedance device, and care must be taken to insure that this resistive component is not so large as to cause the stoppage altogether of oscillations. If the oscillator is to radiate into free space, the radiation resistance may be computed in accordance with the paper by Schelkunoff in the January 1936 issue of the Bell System Technical Journal and of course must be reduced to a value small enough so that the sum of the radiation resistance and all of the positive resistances represented by the circuit losses, as above computed, is less than the magnitude of the negative resistance of Equation 6, consistently with the statement already made. This reduction in radiation resistance may be accomplished by decreasing the size of the gap at 7 through which the radiation emerges. Alternative methods of reducing radiation resistance are described in reference to following figures, and Fig. 4 in particular. Also, of course, for efficient radiation, the circuit resistances should be small as compared with the radiation resistance. When the diode oscillator is operated into a wave guide as in a modification illustrated by a later numbered figure than that at present considered, the resistance inevitably introduced in this way may be adjuted so as to secure the maximum power output and efficiency of the organization as a whole.

It will be noted from Equation 6 that the negative resistance, and hence the driving power for the oscillations, is proportional to the density $I_0$ of the direct electron current. Therefore, in a particular design, if it should so happen that the circuit losses exceed the driving power, oscillations will not be produced unless either the electron current density is increased or else the circuit losses are decreased. Inasmuch as it often is impractical, because of cathode limitations, to increase the current density, the alternative is to decrease the circuit losses. The circuit configurations shown in the figures are devised to have extremely low losses, so that difficulty in obtaining oscillations will practically always be found to lie in an excessive value of radiation resistance. It should be pointed out, however, that reasonable care should be taken in the assembly and pumping processes during the construction of the tube to prevent the formation of high resistance oxides on the inner surface of the resonant cavity. This care consists in the utilization of well-cleaned and oxygen-free materials for the cavity and in the avoidance of excessive temperatures which may cause the deposit on the cavity walls of oxide from the cathode coating, when that type of cathode is employed.

The output power of the diode oscillator in general reaches a maximum when the potential applied to the anode is such as to cause the effective transit time to be 1¼, 2¼, 3¼, etc., cycles, as explained above, and falls off or ceases altogether between these values of potential. This property may be employed to modulate the output wave in accord with speech or other signaling wave. Thus, in Fig. 1 the signal may be introduced at 45 through a microphone and amplifier system in conjunction with a constant potential source 46 to act through the windings of a transformer 47 and cause variations in accord with the signal to be impressed upon the anode potential of the diode. The source 10 is then adjusted so that the output amplitude in the absence of modulating signal is approximately half of the maximum. Under these conditions, the modulating signal causes the output amplitude to vary proportionately thus producing an amplitude modulation of the high frequency output which has been found to be relatively free from amplitude distortion and frequency modulation.

In the development of this Fig. 1 modification, which incidentally has been built and found effective by applicant when caused to oscillate with a wave-length of 10 centimeters and with a transit angle of 5 quarter-cycles, certain possibilities for further improvement were suggested. For instance, since a diode oscillator is essentially a low-impedance device, even a small amount of radiation resistance may be sufficient to cause over-loading or even to stop oscillations altogether, this of couse suggesting the diminution of radiation. As one example, with a tube essentially the same as the one illustrated in Fig. 1, it was found that nearly 500 mils of anode current were necessary for the production of oscillations when the tube was allowed to radiate in free space, as there disclosed, but that only 120 mils were required when the tube was connected into a wave-guide which eliminated much of the radiation resistance. Moreover, in the latter arrangement, and with only 200 mils of current, a much greater amount of power was available for useful application than when the tube was allowed to radiate into space. Having these things in mind applicant has been able to improve the parallel plane diode of Fig. 1, and Fig. 4 illustrates one instance.

Referring now to this Fig. 4 in which like elements are identified similarly as in Fig. 1 illustrating the prototype oscillator, it is to be noted that the principal differentiating feature in this modification is the positioning of the gap in the concentric conductor transmission line, this gap of course, and as was described in connection with Fig. 1, being necessary to provide a circuit discontinuity with respect to the flow of direct current and therefore to make possible the impression of a difference of potential between, effectively, the cathode and the anode. In this figure, this gap, or junction point, as indicated at 7, is positioned about halfway along the concentric cylinder portion of the diode rather than at the end as in Fig. 1. The reason for this is that most of the lines of electric force are perpendicular to the gap when it is placed near the center, as in Fig. 4, but are directed across the gap when it is near the end of the concentric conductor line, as in Fig. 1. This means that there is a smaller tendency for the electric field within the cavity to set up a potential difference across the gap in Fig. 4 than in Fig. 1, the former positioning therefore strongly tending to lessen the radiation as compared with the alternative illustrated by Fig. 1. The efficacy of this expedient has been amply shown by experiment.

Figure 4:
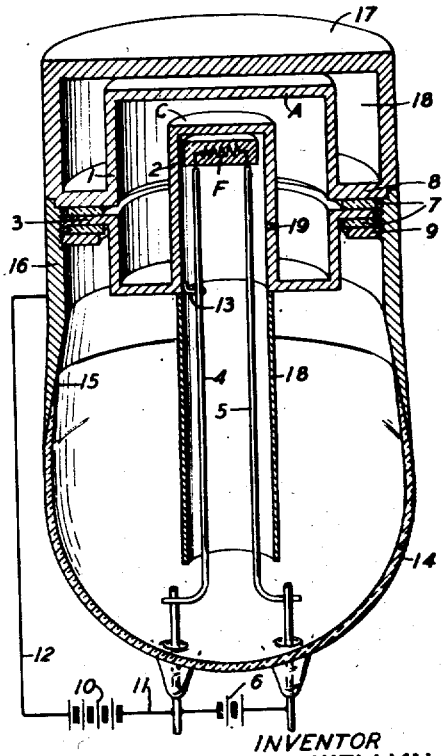
Figs. 4, 5 and 6 illustrate modified forms of the plane electrode diode oscillator otherwise illustrated by Fig. 1 and somewhat more highly organized in order to secure certain specific benefits in operation.

Another slight variance, in Fig. 4, over Fig. 1, has to do with the precise design, other than having to do with positioning, of the above-mentioned gap or junction point. It is noted that in Fig. 4 the effective flange elements based on conductor 1 and between which the ring member 3 and conductor 2 is secured by use of the insulating rings 7, are turned outwardly instead of inwardly from conductor 1 proper. This makes possible the introduction of housing or closure member 17 which is structurally an extension of conductor 1 in the reverse order. This member 17 has no significant function in Fig. 4 as an element of an electrical circuit. It does, however, provide a chamber 18 through which cooling water may be circulated when large anode heat dissipation is desired. Of course a similar jacket may be placed around the anode in Fig. 1.

Another feature disclosed in Fig. 4, but not in Fig. 1, is the effective extension of the conductor 2 into the skirt-like or sleeve-like element 18 partially surrounding the filament leads. By this expedient the cathode heater leads are prevented from absorbing energy radiated through the gap at 7 and dissipating it in their relatively high resistance.

Figure 5:
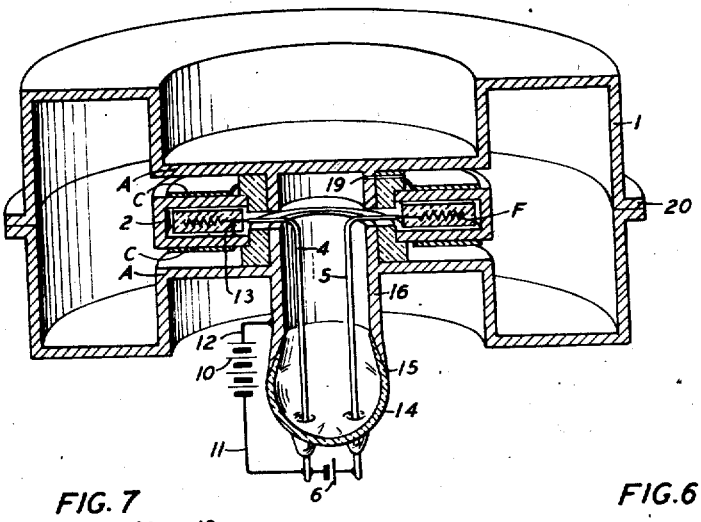

Fig. 5 illustrates a variant form of parallel plane diode oscillator using means, alternative to that of Fig. 4, for decreasing radiation. The figure is so much like that of Figs. 1 and 4 that, with the similar labeling, a detailed description is not considered necessary. The electron discharge takes place between the cathode surfaces C and the opposing anode surfaces A so that, with the critical electron transit angle described in connection with Fig. 3, there exists two negative resistances in series with two capacitances. Resonance is obtained by the inductance provided in the concentric cylinder arrangement of the assembly. The reduction in radiation, and therefore in radiation resistance, results from the fact of an electrically complete closure. Also, the cathode is located wholly within the anode shell, this last feature also permitting a more effective use of the heater energy. The complete closure, that is, the elimination of the gap made necessary in Figs. 1 and 4 by the necessity for conductively separating the cathode and anode, here results from the effective push-pull organization wherein there are effectively two anodes and two cathodes, the two cathodes, which are electrically a unit, therefore being completely isolated from the anodes so as to obviate the necessity of the gaps of Figs. 1 and 4. To this end the junction point 20 is necessary only for convenience of manufacture and assembly and does not imply an electrical separation so that there can be no radiation at this point. As a practical matter the two anode segments would probably be crimped, folded or riveted together to make this junction so as to cause them to be electrically integral.

Figure 6:
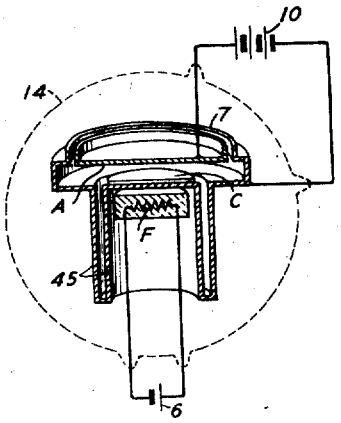

Fig. 6 shows diagrammatically a form of parallel plane diode which, as a class, may be considered distinctive from the class to which belong the modifications illustrated by the earlier numbered figures, in that there is less of an appearance, but not less of an actuality, of an effective resonant circuit or cavity comprising the electrodes and their immediately associated structure. This class of diode oscillator has sometimes been denominated "disc diode oscillator," signifying that in their simple forms these diode oscillators consist merely of two parallel discs, one of which constitutes the electron emitting cathode and the other the anode. As before, the electron discharge occurs between the cathode surface C and the opposing anode surface A, so that, with the critical transit angle described in connection with Fig. 3, there exists a negative resistance in series with a capacitance between the two surfaces. This impedance configuration is continuous for each and every element of area of the electron discharge and, taken in conjunction with the impedance properties which the surfaces themselves present to tangential current flow, forms the admittance and impedance elements of an electrical transmisison line, having in this instance extension in two dimensions as distinguished from the more familiar transmission lne having its extenson in one dimenson only. In Fig. 6, the significance of the structure of the various other parts is believed to be obvious from a consideration of the earlier numbered figures, except as to be pointed out.

What is here termed "disc" is constituted by above described cathode and anode surfaces. Necessarily, the diameters of these two surfaces are equal, although there is nothing very critical governing this relation. When the diameter of the discs is a certain proportion of the free-spaced wave-length $\lambda$, the discs themselves, in view of the extended properties of transmission lines in two dimensions as described in the above paragraph, constitute a resonant system and determine the oscillation frequency. In the specific example illustrated in this Fig. 6, the disc diameter is determined by the root of the Bessel function $$J_0\left(\frac{2\pi r}{\lambda}\right)=0$$

which here replaces Equation 1 for the tuning relation, so that the diameter may be either 0.766, 1.757, 2.755, etc., times the wave-length. A table which shows the first 12 roots of $J_0$ is given on page 286 of "Fourier's Series and Spherical Harmonics" by W. E. Byerly, Ginn and Co. 1893. It is quite practicable to employ open-circuited discs instead of the near-short-circuited discs disclosed in Fig. 6, as by using the structure comprising effectively merely the opposed cathode and anode members, by use of a slightly different Bessel function to determine the diameter in terms of wave-length but in this case the radiation must be confined by a wave guide or other shielding shell, as otherwise the radiation resistance may be so high as to stop oscillations. Because the losses are relatively smaller for small discs the diameter, in the form as shown in Fig. 6, is usually made 0.766 times the wave-length.

It is noted that the gap 7, which effectively conductively isolates the cathode and anode shown in Fig. 6, is remote from the rim of the capsule or disc and is therefore located where the lines of force are substantially perpendicular to the gap, so that only a small amount of radiation can escape, this principle therefore being that already illustrated with reference to Fig. 4.

Another distinctive feature of the diode oscillator of Fig. 6 is the half wave-length line constituted by the structure 45 which surrounds the emitting cathode surface. This insures that only the coated portion of the lower disc operates at high temperature and hence that electron emission can take place only in the region intended so that the electron stream tends to possess the uniform characteristics that are favorable to the production of stable diode oscillations. The purpose of making the line exactly a half wave-length long, rather than some other dimension in terms of wave-length is to prevent this line from introducing reactance into the circuit and thereby upsetting the resonance calculations based on the disc diameters. This is in accordance with now well-known theory of transmission lines of this order of length. Some resistance is unavoidably introduced into the circuit by the line, but can be reduced by making the emitting surface as large in diameter as possible. This has the twofold advantage of reducing the resistance which is introduced by the half wave line, the introduced resistance, as is well known being less when the diameter ratio of a concentric line is nearly unity, and increasing the drive from the electrons.

In general, analogously to the conditions analyzed in the treatment of Fig. 4, the gap 7 should be as small as possible consistently with the avoidance of the tendency for the direct potential to break down the gap and initiate a flow of current thereacross. This is in the interest of decreasing the radiation resistance, although with a larger gap even to the extreme case of the open-circuited form, where there would tend to be such a radiation resistance as to make it difficult to secure oscillations with a normal value of electron current, the effective radiation resistance may be reduced by causing the oscillator to operate into a high impedance, such as may be attained with a wave-guide, or concentric conductor transmission line, as will be shown in later numbered figures, instead of into free space. In such instances of the use of a supplemental electrical network, this network is made to be effectively a part of the resonant circuit by causing the disc diameter to be less than that required in the more simple case shown.

In the disc diode of Fig. 6, the design Formulas 6 to 11 naturally require modification because of the obvious extensiveness of the dimensions in Fig. 6 in comparison with the free-space wavelength. As those who are used to dealing with the solution of the fundamental field equations as applied to cylindrical structures may readily verify, the oscillation conditions for the structure of Fig. 6 are given by the equation $$|r_p| > 0.00233\sqrt{\mu\sigma}\lambda^{3/2}\frac{(\beta a)^2}{(\beta c)^2}\left[\frac{J_1^2(\beta a)}{J_0^2(\beta c)+J_1^2(\beta c)}\right]\left[1+\frac{\lambda c}{2a^2}\frac{J_1^2(\beta c)}{J_1^2(\beta a)}\right] \quad (12)$$

where a is the disc radius, c is the cathode radius, $\beta$ is $2\pi/\lambda$, and $J_0$ and $J_1$ are the usual Bessel functions of zero and first order, respectively, as defined on page 219 in the Byerly reference given above, all dimensions being in centimeters. The quantity $r_p$ is merely the magnitude of the negative resistance, Equation 6, reckoned per unit area, namely $$|r_p| = 1.4\lambda^4 I_0 10^{-3}\left(\frac{4n+1}{5}\right) \quad (13)$$

In the above Equation 12 the resistance introduced by the half-wave line in Fig. 6 is represented by the second term within the last pair of brackets in Equation 12 and may become the dominating loss. This, of course, suggests immediately the omission of the line, and in cases where cathode heating power is not an important practical item, the half-wave line may well be omitted, as its function is merely that of confining the heat to the coated portion of the lower disc in Fig. 6. In Equation 12 no allowance has been made for radiation resistance which may perform the function of a load resistance, and should then be proportioned to absorb the maximum power.

Figure 7:
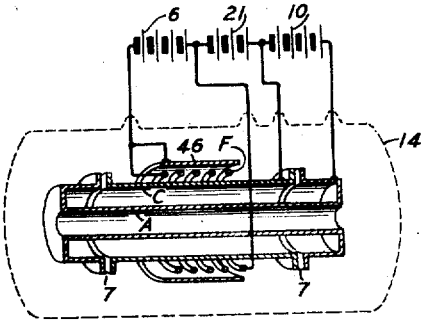
Fig. 7 illustrates a cylindrical type of diode oscillator employing an external cathode.

Fig. 7 illustrates the first instance, in these drawings, of the use of the cylindrical electrode diode oscillator. While the cathode is here shown mounted exteriorly of the anode, the reverse relation could equally well be used. The inner cathode alternative perhaps has the advantage over the other alternative of making more effective use of the heater energy, but with the inner cathode care must be taken that the ratio of the inner diameter of the outer cylinder and the outer diameter of the inner cylinder does not exceed two, else no oscillations will be produced. This illustrates the principle which has already been mentioned in the description of the plane electrode diode with reference to the order of areas of the cathode and anode. From a different point of view, a cylindrical electrode diode using the permissible order of diameters would tend to approximate, so far as concerns unit areas or the space between unit areas, a plane electrode diode, and the theories developed with respect to such plane electrode diode are equally applicable thereto.

Another feature of the diode of Fig. 7 is the special cathode design which permits use of a material such as tungsten, whose resistivity is less than that of the usual oxide coated cathode surface, but whose operating temperature is so high that the materials for support would tend to fuse. Here, the tungsten cathode surface obtains some heat directly from the hot filament but also much of its heat indirectly by electron bombardment from the filament which is biased negatively with respect to the cathode by the battery 21, so that the heated portion of the cathode may be confined to a region far enough away from the support that the supporting material is not called upon to withstand its abnormally high temperature. The shield 46 prevents the loss by heat by thermal radiation and thus increases the heater efficiency. In many instances it could be dispensed with as could also the specific method of transmitting heat from filament to cathode, this latter in favor of the more conventional means shown in the earlier numbered figures. The inner anode A of Fig. 7 carries the entire high frequency current, but may be cooled as by circulating water, and constructed of low-resistance material, such as copper, so that its high-frequency energy dissipation is small.

With reference to cylindrical electrode diode oscillators generally, it has been found that the negative resistance produced by the electrons in the arrangement of Fig. 7 with inner anode is somewhat greater than in the plane type of diode oscillator although perhaps this type has been less favored so far because of the difficulty of obtaining a circuit design characterized by the low losses possible with the plane electrode diode. Fig. 7 however illustrates an arrangement, which is in the right direction, having in mind this possible deficiency since the diodes, constituted partly by the cathode and anode proper, have the form of a half wave concentric line. As in certain other figures, use is made of the expedient of placing the gap 7 between cathode and anode as far from the end of the line as practicable. If this gap were positioned even further from the end it would tend to be so close to the heated portion of the cathode that the supporting structure, which as a practical matter would tend to approximate this gap in position, would not be able to withstand the high temperature.

Fig. 8 illustrates the use of a concentric conductor arrangement in cooperation with a diode oscillator, as in accordance with suggestions made in connection with the descriptions of the earlier numbered figures. That is, the concentric conductor transmission line coupled to a diode oscillator, as in this figure, makes possible a convenient and simple variation of the tuning, reduces the radiation resistance and makes possible its critical adjustment, and enables the withdrawal from the oscillator of a greater amount of power. High frequency energy from the electron discharge between cathode and anode passes down the coaxial section 1, 2, and enters the coaxial section 2, 22, 24 through the glass section 25. The length of the last-mentioned coaxial section is adjustable by means of the movable ring 25a which fits loosely enough about the inner conductor 22 so that the high frequency energy output may be delivered to the portion of the coaxial transmission line to the right of the ring 25a.

While the diode oscillator as illustrated in Fig. 8 is of the planar electrode type, the principle is applicable quite generally, so that the disclosure of the diode oscillator element herein should be thought of as merely typical of the several alternatives available.

The coupling through air-gap 23 should desirably be as close as possible. Except for the fact that a direct connection between the conductor 22 and the anode would place a direct potential on an indefinite length of the concentric conductor line, with attendant hazards of leakage, short circuit, etc., a direct electrical connection, obviating the necessity of an air-gap, could be used. It is noted that the organization of elements as in accordance with this modification permits keeping the filament supply leads out of the high frequency field. The relation of diameters of conductors 2 and 22 is not of especial significance. They could well have equal values. The spacing of element 25a from conductor 22, which is assumed to be variable determines the permissible radiation. In practice, the movable section 25a is adjusted until the electrical length of the coaxial line is a whole number of half wave-lengths, thus accomplishing the tuning of the diode elements for the production of oscillations.

Fig. 9 illustrates, analogously as Fig. 8, the use of a circuit network coupled to the diode oscillator to stabilize and enhance the circuit characteristics thereof. In this instance the network is a wave guide as distinguished from the concentric conductor line of Fig. 8. A wave guide may have a variety of forms, but in general comprises either a dielectric rod or a hollow conducting tube, into either of which an electromagnetic wave of high frequency is introduced. Wave guides generally, and specific forms of couplings and terminations for the same are disclosed, per se, in Southworth applications Serial No. 745,457, filed September 25, 1934, and Serial No. 73,940, filed April 11, 1936. A prior application by applicant, Serial No. 43,302, filed October 3, 1936, also discloses prior art forms of wave guides and Fig. 2 therein illustrates a means for coupling the wave guide to the wave source. Fig. 9 of the present application is the same as said Fig. 2 of said prior application except as comprising a diode oscillator as the specific wave source.

The wave guide, per se, is constituted by a hollow conducting tube 27, or the like. The diode oscillator is shown in the constricted portion of this tube 27 at the extreme left of the figure, the transition between the tube 27 proper and this mounting portion having the form of a hollow cone 28. To prevent radiation losses from the diode oscillator, the coupling to the wave guide is constituted by connecting it between the wave guide, at this conical portion 28, and the additional conducting cone 29. At the other end of the wave guide a similar pair of conical elements is employed to connect the guide with the energy receiver 30, here shown diagrammatically. When waves from the diode source reach the conical members at the end of the wave guide to which it is coupled, no severe reflection of the waves results. That is, when the ratio of the diameters of the large ends of the cones at the left end of the wave guide is adjusted to match the impedance of the wave guide while the ratio of the diameters of the small ends of the same two cones is adjusted to match the impedance of the diode oscillator, the conical members perform the function of an impedance transformer effectively coupling the diode oscillator with the wave guide.

The remaining figures of the drawings represent a relatively large departure from the teachings of the earlier numbered figures, especially as having to do with diode oscillator organizations in which there is an initial electron velocity and acceleration as compared with the zero electron velocity and acceleration assumed heretofore. In said earlier described diode oscillators the fact that the electrons start from rest necessitates moderately high potentials on the anode if the transit time is to be held to a moderately small number of cycles, as in accordance with the analysis presented. Moreover, the fact that the anode is operated at a high potential means that the heat developed by impact of electrons tends to be quite large and this tends to decrease the efficiency. Applicant has discovered, and as may be readily proved by mathematical analysis along the lines presented in the early part of this specification, that an electron stream entering a resonant cavity at high velocity through an orifice in its wall and leaving the cavity through another orifice in the opposite parallel wall, produces the same negative resistance, as compared with the diodes of the earlier numbered figures, when its transit time within the cavity responds to the conditions prescribed for said other type of diode oscillator in the operation of which electrons would correspondingly leave the wall of the cavity from rest. From this discovery it follows that the resonant cavity may be operated at high potential in conjunction with the use of a focussing electrode or set of focussing electrodes to cause the electron stream to pass through it without impinging on its walls. Impingement on the walls and would not tend to inhibit the operation of the principle, but would result in unnecessary heating and a consequent lowering of the efficiency. After the electrons have left the resonant cavity they may be collected by an anode-like electrode operating at a low positive potential so that the over-all efficiency of the device is improved at the same time that the transit time of the electrons within the cavity is decreased about 50 percent for a given accelerating potential.

Figure 10:
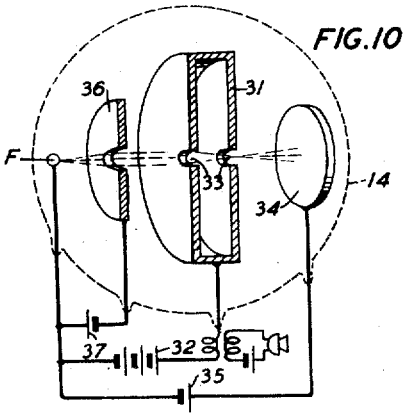

In Fig. 10 the resonant cavity 31 is analogous to the complete diode oscillator of the earlier numbered figures and in the particular example of Fig. 10 the cavity partakes of the character shown in the disc diode of Fig. 6. In Fig. 10 the cavity 31 is biased by source 32 relatively to electron source F so that electrons from source F tend to be urged thereto. Aligned slots 33 permit the electron stream to pass through the cavity and impinge on the anode-like collector 34 on which a relatively low positive potential is impressed by source 35. In order more nearly to insure a minimum of wastage of electrons and heating attendant on their impingement on the cavity, the focussing ring 36 may be used. Instead of a ring a series of electrodes electrically integral with each other and in general conforming to the ring so far as concerns its focussing function may be used. Source 37 impresses thereon an appropriate biasing potential which may be negative. Obviously the conformity of the openings in the focussing electrode should be governed by the corresponding shape of the slots in the cavity to insure effective cooperation therewith, that is, to focus the electrons so that they tend to pass through said slots without impingement on contiguous structure. Consistently with theory the slots may have widely variant forms, except that, for practical reasons, they should be simple and regular in outline. Where generally rectangular slots are used, as shown, it is immaterial as to the conformation of the corners, as between angular or curvilinear.

Figure 11:
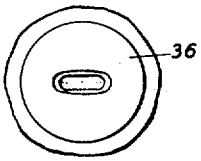

Fig. 11 represents a broken view of the organization of Fig. 10 and especially a view of the cavity as seen through the opening in the focussing electrode 36.

In the design of the type of diode illustrated by Figs. 10 and 11, the transit time of electrons through the resonant cavity should be 5, 19, 13, 17, etc., quarter-cycles, just as in the case where they start from rest within the cavity, and the resistance is given by the same equations, 2 and 6, in the latter of which the expression $$\pi r_2^2$$

represents the area of the electron stream through the cavity. The transit angle is given by Equation 3 in which $V_0$ represents the biasing potential on the cavity measured with respect to the electron source and the factor A is 3650 instead of the higher values applicable when the electrons start from rest within the cavity. The design of the cavity differs in no wise from the principles already described in connection with previously numbered figures, consisting in the choice of a configuration resonant to the desired frequency and having losses less than the power input from high frequency current flowing through the negative resistance of the electron stream.

In connection with these Figs. 10 and 11 as well as with those to follow, namely, 12 to 14, it may be emphasized that as in preceding figures the interaction between the electron stream and the high frequency field which it produces takes place altogether within a resonant cavity, and that the orifices which admit the entrance and exists of electrons from the cavity should preferably be small so that electrons outside of the cavity are under the influence of constant or direct current fields only.

Figure 12:
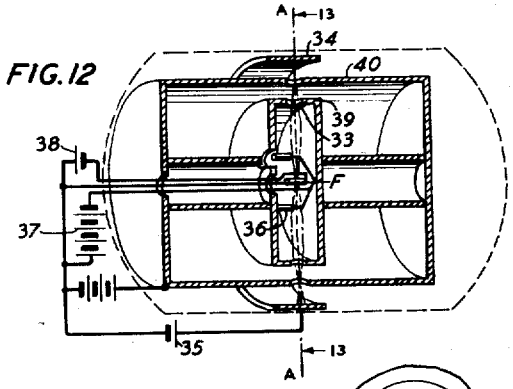
Figure 13:
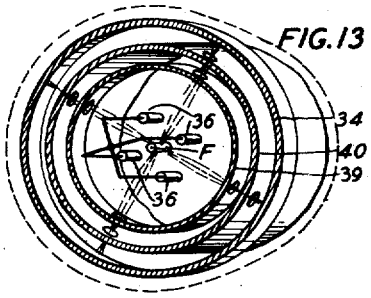

Fig. 12 illustrates a slightly variant form of the organization of Fig. 10 in which there is introduced the concentric electrode feature, as in some of the earlier numbered figures, and therefore in which the electrons are emitted radially instead of in approximate parallel beams. The electrons are emitted from filament F which is energized from source 38, and are focussed by unitarily connected elements 36 (which may have either the form here shown or the form of a ring as in Fig. 10), so as to pass through the resonant cavity between the conducting elements 39 and 40 by entering and leaving respectively through the aligned slots in said elements 39 and 40 and finally impinge on the anode-like collector 34. Fig. 13, which illustrates a section at line A—A of Fig. 12 perhaps shows the relations of the elements a little better than Fig. 12. The collector element 34, as is indicated by the use of the same reference numeral, is the functional equivalent of the collector 34 of Fig. 10. The elements 39 and 40, although of a different configuration, are the functional equivalents of the opposed parallel walls of the cavity 31 of Fig. 10 or the conductors 1, 2, together with the cathode and anode surfaces C, A of Fig. 1. In the organization illustrated by this Fig. 12 there is a certain economy over the alternative of Fig. 10 in that a plurality of electron streams, four in the instance illustrated, may be used so that effectively the resultant diode constitutes four diodes operating in parallel.

A feature of the modification illustrated by Fig. 12, which is not suggested by Fig. 10 although quite analogous to a like element in some of the earlier numbered figures, is the extension of the slotted elements, 39, 40 in Fig. 12, so as to form the resonant cavity of which the diode proper constitutes only the mid segment.

Figure 14:
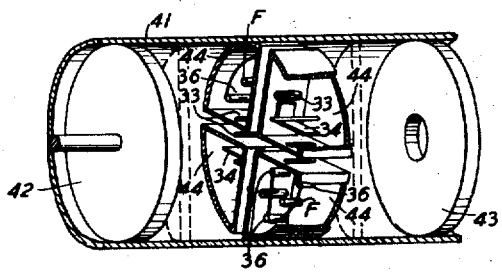

Fig. 14 illustrates how a diode oscillator conforming generally to the type illustrated by Figs. 10 to 13 may cooperate with a wave guide analogously as in Fig. 9. In order to have a most effective coupling to the wave guide, a type of diode oscillator alternative to that shown in Figs. 10 to 13, although still using the same finite initial electron velocity principle, is used.

The wave guide is the conducting tube 41 closed at its two ends by movable plunger or the like 42 and the movable iris diaphragm 43 which is similar in structure and function to element 25*a* of Fig. 8. The relative positions and spacing of elements 42 and 43 determine the resonant frequency of the wave guide system and the opening in the iris diaphragm determines the extent of radiation. This opening may be varied as in the instance of the iris diaphragm of a camera. In fact, a camera diaphragm has been used successfully in experiments conducted on this particular wave guide organization.

The diode oscillator component of this system of Fig. 14 is shown in the center. It is a multi-unit diode, each unit of which is effectively the same as the diode of Fig. 10 and, with it, is characterized by the use of finite, instead of zero, initial electron velocity within the resonant cavity. The diodes proper are constituted, respectively, by the adjacent parallel walls of the closed segments 44 of a split hollow cylinder. The electrons are generated by emitters F similar to those used in the earlier modifications, positioned within alternate segments. In Fig. 14 they are shown in the upper left and lower right segments. The two beams of electrons from each emitter are focussed by the means 36 which are similar to the corresponding means of Fig. 12 so as to traverse the slots 33 similarly as in the other figures of this group, into an adjoining closed segment which contains a low potential collector 34. These various elements are biased as in the other modifications. It is evident that when the diode just described is placed within the wave guide, as shown, the four streams of electrons will be capable of reacting with a type of electric field characteristic of the wave guide, which consists of coaxial circles. This type of wave will therefore be produced directly by the electrons when their angles of transit between adjacent segments of the split cylinder is 1¼, 2¼, 3¼ etc., cycles of the generated wave.

In all of these diode oscillators, the output reaches a maximum when the electron transit time is 1¼, 2¼, 3¼ etc. cycles of the high frequency, and modulation may be accomplished by the means described in reference to Fig. 1. In Fig. 10, for example, the modulating signal is introduced in series with the potential source 32 just as in Fig. 1 it was introduced in series with the potential source 10 and in other modifications, where not shown, the modulation could be similarly accomplished.

As should be evident from the preceding description, the invention may be exemplified in many diverse forms other than the few typical forms shown without departing from the spirit of the invention as defined in the appended claims.

What is claimed is:

1. A diode oscillator comprising a conducting member containing a cavity in an evacuated space, said cavity being resonant at a desired frequency, and means for causing a flow of electrons through said cavity, said means providing that the electron velocity be such that the time required for the electrons to traverse the cavity exceeds the periodicity corresponding to said resonance frequency, or an integral multiple thereof, by one-quarter cycle.

2. The circuit specified in claim 1 comprising additionally means for modulating the oscillations comprising means for varying the time of said traverse.

3. A method of generating electrical oscillations, using two unformly spaced surfaces contained in an evacuated space, a cathode element, an electrical difference of potential means for causing a flow of electrons from said cathode element through the space between said surfaces, and an electrical resonant system including said surfaces, said method comprising the steps irrespective of order, of tuning said system to the frequency of the desired oscillations and adjusting said difference of potential until the space between said surfaces exhibits negative resistance at the said frequency, whereby oscillations occur at the said desired frequency.

4. A method of generating electrical oscillations, using two uniformly spaced surfaces contained in an evacuated space, one of said surfaces being a cathode surface, an electrical difference of potential means connected to said surfaces for actuating the emitted electrons from the cathode surface to the second surface, and *means forming with said surfaces a cavity resonator* [an electrical resonant system including said surfaces], said method comprising the steps, irrespective of the order, of tuning said [system] *resonator* to the frequency of the desired oscillations, and adjusting said difference of potential until the space between said surfaces exhibits negative resistance at the said frequency, whereby oscillations occur at the said desired frequency.

5. The method specified in claim 4 in which the electron transit time is made to exceed the cycle time of the generated wave, or an integral multiple thereof, by one-quarter cycle.

6. A method of generating electrical oscillations, using two coaxial cylindrical surfaces contained in an evacuated space, the outer surface being a cathode surface, electrical difference of potential means connected to said surfaces for actuating the emitted electrons from the cathode surface to the second surface, and an electrical resonant system including said surfaces, said method comprising the steps, irrespective of the order, of tuning said system to the frequency of the desired oscillations and adjusting said difference of potential until the space between said surfaces exhibits negative resistance at the said frequency, whereby oscillations occur at the said desired frequency.

7. The method specified in claim 6 in which the electron transit time is made to exceed the cycle time of the generated wave, or an integral multiple thereof, by one-quarter cycle.

8. A method of generating electrical oscillations, using a substantially plane cathode, a substantially plane anode positioned substantially parallel to said cathode, means for biasing said anode positively with respect to said cathode, and an electrical resonant system [connected] *forming* with said cathode and a mode *a cavity resonator*, said method comprising the steps, irrespective of order, of tuning said system to the frequency of the desired oscillations and adjusting said biasing potential until the space between said cathode and anode exhibits negative resistance at the said frequency, whereby oscillations occur at the desired frequency.

9. The method specified in claim 8 comprising the additional step of varying the biasing potential applied to said anode as in accordance with a signal and thereby controlling said oscillator so as to produce modulation products.

10. The method specified in claim 8 in which the electron transit time is made to exceed the cycle time of the generated wave, or an integral multiple thereof, by one-quarter cycle.

11. A method of generating electrical oscillations, using two uniformly spaced and at least partially curvilinear surfaces, the surface having the larger radius of curvature being a cathode surface, electrical difference of potential means connected to said surfaces for actuating the emitted electrons from the cathode surface to the second surface, and an electrical resonant system including said surfaces, said method comprising the steps, irrespective of the order, of tuning said system to the frequency of the desired oscillations and adjusting said difference of potential until the space between said surfaces exhibits negative resistance at the said frequency, whereby oscillations occur at the said desired frequency.

12. A method of generating electrical oscillations, using two uniformly spaced cathode and anode surfaces contained in an evacuated space, electrical difference of potential means connected to said surfaces for actuating the emitted electrons from the cathode surface to the anode surface, and an electrical resonant system including said surfaces, said method comprising the steps, irrespective of the order, of tuning said system to the frequency of the desired oscillations and adjusting said difference of potential until the space between said surfaces exhibits negative resistance at the said frequency, the positive resistance of said electrical system being less than said negative resistance, whereby oscillations occur at the said desired frequency.

13. A diode oscillator comprising two uniformly spaced cathode and anode surfaces in an evacuated space, and forming part of a resonant cavity comprising a cylindrical extension of one said surface and a tubular extension of the other said surface so as effectively to constitute a substantially complete housing for the first surface and its extension, means substantially closing the space between said extensions at the end of the housing remote from said surfaces, means insulatingly dividing said housing so as conductively to separate said two surfaces, said resonant cavity being so dimensioned that, with the capacitance between said surfaces, it tends to resonate at such a periodicity that the electron transit time between said surfaces in relation to said periodicity is appropriate to produce negative resistance between said surfaces, the positive resistance of the cavity being less than said negative resistance.

14. A diode oscillator specified in claim 13 in which said insulatingly dividing means comprises a non-conducting space proximate to the end of the housing which is remote from said surfaces.

15. A diode oscillator comprising two equidistant surfaces contained in an evacuated space, in combination with structure adapted to constitute with said surfaces a substantially closed conducting cavity which simulates within itself as to function a resonant inductor-capacitor organization tuned to the frequency of the desired oscillations, the electrical and physical dimensions of the oscillator as a whole being such that the electron transit time between said surfaces in relation to the resonant period of said cavity is appropriate to produce negative resistance in said cavity.

16. A diode oscillator comprising two uniformly spaced surfaces contained in an evacuated space, means for causing electron emission from one surface, means connected to said surfaces for actuating the emitted electrons from the first surface to the second surface, a structure integrally connected to said surfaces to constitute therewith a substantially closed conducting cavity which simulates as to function a resonant inductor-capacitor organization, the electrical and physical dimensions of the oscillator as a whole in relation to the resonance characteristics of said cavity being such as to produce within said cavity an effective negative resistance.

17. The combination specified in claim 15 in which the electron transit time exceeds the periodicity of said resonant cavity, or an integral multiple or submultiple thereof, by one-quarter cycle.

18. A diode oscillator comprising two coaxial conducting cylindrical surfaces, an electrically conducting means cooperating therewith to constitute the whole a substantially enclosed structure, means for causing electron emission from the outer cylindrical surface, means for impelling said electrons to the inner cylindrical surface, said substantially enclosed cylindrical structure constituting a resonant reactance combination which tends to resonate at such a frequency in relation to the other electrical and physical dimensions of the oscillator as a whole that the electron transit time between said surfaces is appropriate to produce negative resistance.

19. The combination specified in claim 18 in which the electron transit time exceeds the cycle time of the generated wave, or an integral multiple thereof, by one-quarter cycle.

20. A diode oscillator comprising two coaxial cylindrical surfaces, means for causing electron emission from the outer cylindrical surface, means for impelling said electrons to the inner cylindrical surface, a heat shield substantially surrounding the emitting portion of said outer cylindrical surface, and, connected to said surfaces, an electrical system adapted to resonate at such a frequency that the electron transit time between said surface is appropriate to produce negative resistance.

21. A diode oscillator comprising two coaxial cylindrical surfaces, a heater circuit for causing electron emission from the outer cylindrical surface, means for positively biasing said outer cylindrical surface with respect to said heater whereby heating of said cylindrical surface by bombardment of electrons is achieved additionally to heating by radiation from the heater, a heat shield substantially surrounding said heater and the emitting portion of said outer cylindrical surface, means for impelling the emitted electrons to the inner cylindrical surface, and connected to said surfaces, an electrical system adapted to resonate at such a frequency that the electron transit time between said surfaces is appropriate to produce negative resistance.

22. A diode oscillator comprising a first tubular conducting member closed at one end, a second tubular conducting member substantially surrounding said first tubular conducting member, but having a flange portion connected to and coextensive with the open end of said first tubular member so as to form therewith a hollow cavity, heating means for the closed end of said first tubular member, the leads for which are enclosed by said member, whereby electrons are emitted from the closed end of said member, means connected to said second tubular member for actuating the emitted electrons to the contiguous end member of said second tubular member, the cavity comprised by the tubular members constituting, effectively, an electrically resonant inductor-capacitor combination having such a periodicity, when taken with the remaining electrical and physical dimensions of the oscillator as a whole, that the transmit time of said electrons is appropriate to produce negative resistance between the contiguous end surfaces of said tubular members.

23. A diode oscillator comprising two uniformly spaced surfaces contained in an evacuated space, means constituting one surface a thermionic electron emitter, and a positive potential biasing means for the other surface relatively to the first surface so as to constitute said second surface an electron collector, in combination with other structure constituting with said equidistant surfaces a substantially closed system resonant at a frequency at which the electron transit time between said equidistant surfaces is appropriate to produce negative resistance.

24. A diode oscillator comprising a conducting member containing a cavity in an evacuated space, said member being resonant at a desired frequency, spaced apertures in said member, an electron emitting means, means for positively biasing said member relatively to said means to produce an electron beam between said emitting means and said cavity, means for conforming said beam approximately to said apertures whereby the beam enters and exits said cavity thereby, and a positively biased collector means contiguous to said cavity on the exit side thereof, the electrical dimensions of said oscillator relatively to the dimensions of said cavity providing an electron velocity such that the time required for the electrons to traverse the cavity exceeds the cycle time corresponding to said resonant frequency, or an integral multiple thereof, by one-quarter cycle.

25. The circuit specified in claim 24 including additionally means for varying the biasing potential applied to said cavity as in accordance with signals whereby to modulate the wave product of said diode oscillator.

26. A method of generating electrical oscillations, using two uniformly spaced surfaces contained in an evacuated space, one of said surfaces being a cathode surface, electrical difference of potential means connected to said surfaces for actuating the emitted electrons from the cathode surface to the second surface, and an electrical resonant system including said surfaces, the electrical conditions of the recited structure being such that the flow of electrons between said surfaces is attended by substantially complete space charge, said method comprising the steps of tuning said system to the frequency of the desired oscillations and adjusting said difference of potential until the space between said surfaces exhibits negative resistance at the said frequency, whereby oscillations occur at the said desired frequency.

27. The circuit specified in claim 26 in which there is a partially complete space charge.

28. The circuit specified in claim 26 in which there is substantially no space charge.

29. A diode oscillator comprising two equidistant surfaces contained in an evacuated space, in combination with structure adapted to constitute with said surfaces a conducting resonant cavity which simulates within itself as to function, a resonant inductor-capacitor organization tuned to the frequency of the produced oscillations, the electrical and physical dimensions of the oscillator as a whole being such that the electron transit time between said surfaces in relation to the resonant period of said cavity is appropriate to produce negative resistance in said cavity at said frequency.

*30. The method of exciting within a closed conducting chamber oscillations of its natural interior resonance frequency which comprises projecting through at least a portion of the interior of the chamber a beam of electrons in a direction parallel to the electric field resulting within the chamber from oscillations of said natural resonance frequency and causing the electrons to assume periodically varying velocities therein whereby they may become concentrated in groups.*

*31. A substantially closed chamber of electrically conducting material, the chamber having a natural electrical resonance frequency at a desired operating frequency by virtue of its physical configuration, and means for propagating electrons along a path from one point within the chamber to another point also within the chamber to cause the electrons to assume periodically varying velocities and to become concentrated in groups.*

*32. A substantially closed resonance chamber bounded by surfaces of electrically conducting material, said chamber being adapted to generate standing electrical waves of a desired operating frequency within the chamber, said waves tending to set up an electrical field extending in a given direction, and means for propagating electrons along a path within the chamber, the path having a direction parallel with that of said electric field to cause the electrons to assume perodically varying velocities and to become concentrated in groups.*

*33. A substantially closed chamber bounded by electrically conducting surfaces and having a natural resonance for electrical oscillations within the chamber, means for setting up oscillations of the corresponding resonance frequency therein, an evacuated container including a cathode and anode, each having terminals extending outside the container, a source of electromotive force connected electrically in series with the terminals to produce an electron stream between the cathode and anode, the evacuated container being physically connected to the closed electrically resonant space to include at least a portion of said substantially closed chamber in the path of travel of the electrons from the cathode to the anode, whereby the electrons may react with the electromagnetic field within the closed chamber to cause the electrons to assume periodically varying velocities and to become concentrated in groups.*

*34. A substantially closed chamber bounded by electrically conducting surfaces and having a natural resonance frequency for confined electrical oscillations which is dependent upon the dimensions and physical configuration of the chamber, and means supplying electrons within said chamber and causing the electrons within said chamber to assume periodically varying velocities whereby they may become concentrated in groups, said means including a cathode, an anode, and a source of space current connected to the cathode and anode, at least a portion of the space path between the cathode and anode along which the electrons pass being included within said chamber.*

*35. Apparatus of the character described having, in combination, means for producing a stream of electrons, an internally resonant hollow body having a reentrant pole, and means for projecting the stream of electrons through the space within said body between said reentrant pole and the opposite wall of said body.*

*36. The method of exciting a resonant circuit having an enclosed electromagnetic field, which consists of causing a stream of electrons to enter a region substantially enclosed and containing the oscillating electromagnetic field of said circuit and to pass through it, causing the electrons to be subjected to alternate increases and decreases of speed in the direction of travel thereof while in said region, and causing them to leave said region with less energy than they had when they entered it, thus sustaining oscillation of the circuit.*

*37. The method of exciting a resonant circuit which consists of causing a stream of electrons to enter the oscillating electromagnetic field of said circuit in a region that is substantially enclosed, causing the electrons to be subjected to alternate increases and decreases of speed in the direction of travel thereof in the field, and causing them to leave the field with less energy, in the aggregate, than they had when they entered it, thus delivering energy to the electromagnetic field and sustaining oscillation of the circuit.*

*38. The method of exciting a resonant circuit which consists of causing a stream of electrons to enter a region of standing electromagnetic waves that is substantially enclosed through a field discontinuity at the boundary of said region, causing the electrons while in said region to interact with the field of the circuit to alternately increase and decrease the speeds of the electrons in the direction of travel thereof, and causing the electrons to leave the region through another field discontinuity with reduced energy, thus delivering energy to the electromagnetic field and sustaining the oscillation of the circuit.*

*39. The method of producing eelctromagnetic oscillations in a hollow conducting member, comprising projecting a stream of electrons into said hollow conducting member, sinusoidally altering the velocity of the electrons in the direction of travel thereof in said member by an electromagnetic field resonant in said member, whereby traveling electron groups are formed within said member, causing said groups to be alternately accelerated and decelerated by said electromagnetic field, and thereafter quickly removing said trav-* eling electron groups from said field when they have been decelerated to a minimum velocity.

40. A method of controlling an electron stream that comprises causing electrons of the stream to enter a confined oscillating electromagnetic field and thereafter to travel in the field to cause the electrons thereafter to gain energy from and lose energy to the field, and causing the electrons to leave the field at times when the field has gained energy on the whole from the electrons.

41. A method of controlling an electron stream during its passage through an oscillating electromagnetic field having standing electromagnetic waves contained in an internally resonant conducting hollow body that comprises causing electrons of the stream to assume periodically varying velocities in a predetermined region of the field, and causing the electrons thereafter to travel in the field beyond the said region to produce interaction at the resonant frequency of the field between the electrons of the stream and the field to cause the electrons of the stream, as they pass through the field, to become concentrated in groups in a second predetermined region of the field.

42. A method of controlling an electron stream during its passage through an oscillating electromagnetic field having standing electromagnetic waves contained in an internally resonant conducting hollow body that comprises imparting to the electrons of the stream in a predetermined region of the field increments and decrements of energy of the period of the field to cause the electrons of the stream to assume periodically varying velocities, and causing the electrons thereafter to travel in the field beyond the said region to produce interaction at the resonant frequency of the field between the electrons of the stream and the field to cause the electrons of the stream, as they pass through the field, to become concentrated in groups in a second predetermined region of the field.

43. A method of controlling an electron stream during its passage through an oscillating electromagnetic field having standing electromagnetic waves contained in an internally resonant conducting hollow body that comprises imparting to the electrons of the stream in a predetermined region of the field increments and decrements of energy of the period of the field to cause the electrons of the stream to assume periodically varying velocities, causing the electrons thereafter to travel in the field beyond the said region to produce interaction at the resonant frequency of the field between the electrons of the stream and the field to cause the electrons of the stream, as they pass through the field, to become concentrated in groups in a second predetermined region of the field, and imparting to the electrons individually in the second region greater increments and decrements than in the first-named predetermined region, with the decrements exceeding the increments.

44. A method of controlling an electron stream during its passage through an oscillating elecromagnetic field having standing electromagnetic waves contained in an internally resonant conducting hollow body, the said hollow body containing also a substantially magnetic field component, the said method comprising causing electrons of the stream to assume periodically varying velocities in a predetermined region of the field, and causing the electrons thereafter to travel in the field beyond the said region to produce interaction at the resonant frequency of the field between the electrons of the stream and the field to cause the electrons of the stream, as they pass through the field, to become concentrated in groups in a second predetermined region of the field.

45. A method of controlling an electron stream during its passage through an oscillating electromagnetic field having standing electromagnetic waves contained in an internally resonant conducting hollow body that comprises passing an electron stream having a substantially uniform distribution in time from outside the body into and through the field, and regulating the time of flight of the stream in the field to produce interaction at the resonant frequency of the field between the electrons of the stream and the field to cause the electrons of the stream, during their travel through the field, to deliver energy to the field at the resonant frequency of the field thereby to excite and maintain electromagnetic resonance in the field at the resonant frequency of the field.

46. A method of exciting a resonant circuit having an electromagnetic field in a substantially enclosed region that comprises causing a stream of electrons to enter into and to travel in the region, increasing and decreasing the speed of the electrons in the direction of travel thereof during their travel in the region, and causing the electrons to leave the region with less energy than they had when they entered it, thus sustaining oscillation of the circuit.

47. Apparatus for generating alternating-current energy having, in combination, a space-resonant device having a bounding surface, and means for passing an electron stream through a portion of the bounding surface into the space-resonant device, said device being of such proportions and the electrons of said stream having such velocities that a resonant oscillating electric field is established in the space-resonant device to cause the electrons to assume in a predetermined region of the field near the said portion of the bounding surface periodically varying speeds of the frequency of the field, in the direction of travel of the electrons, thereby to cause the electrons to become concentrated in groups during their further travel in the field, and to cause the electron groups to leave the field at another portion of the bounding surface to cause the electrons of the groups to transfer energy to the field to sustain it in oscillation.

48. Apparatus of the character described having, in combination, a space-resonant device, and means for passing an electron stream into the space-resonant device to establish an oscillating resonant electromagnetic field in the space-resonant device, the dimension of the space-resonant device in the direction of travel of the electron stream and the resonant frequency of the field being so related to the velocity of the electron stream in the space-resonant device as to cause the field to abstract energy from the electron stream.

49. Apparatus of the character described having, in combination, a space-resonant device, and means for passing an electron stream into the space-resonant device to establish an oscillating resonant electromagnetic field in the space-resonant device, the dimension of the space-resonant device in the direction of travel of the electron stream and the resonant frequency of the field being so related to the velocity of the electron stream in the space-resonant device as to cause

*the electrons, when in the space-resonant device, first to assume periodically varying velocities as a function of the time of entry into the space-resonant device, secondly, to cause the faster electrons to gain upon the slower electrons to cause the electrons to become concentrated in groups within the space-resonant device, and thirdly, to cause the groups to leave the field with less energy than when the electrons entered the field, thereby to transfer energy to the field.*

*50. Apparatus of the character described having, in combination, a space-resonant device, means for passing an electron stream into the space-resonant device to establish an oscillating resonant electromagnetic field in the space-resonant device, the dimension of the space-resonant device in the direction of travel of the electron stream and the resonant frequency of the field being so related to the velocity of the electron stream in the space-resonant device as to cause the electrons, when in the space-resonant device, first to assume periodically varying velocities as a function of the time of entry into the space-resonant device, secondly, to cause the faster electrons to gain upon the slower electrons to cause the electrons to become concentrated in groups within the space-resonant device, and thirdly, to cause the groups to leave the field with less energy than when the electrons entered the field, and means for extracting energy from the field.*

*51. Apparatus of the character described having, in combination, a space-resonant device having a bounding surface, and means for passing an electron stream through a portion of the bounding surface into the space-resonant device to establish an oscillating resonant electromagnetic field in the space-resonant device, the dimesion of the space-resonant device in the direction of travel of the electron stream and the resonant frequency of the field being so related to the velocity of the electron stream in the space-resonant device as to cause the electrons, when in the space-resonant device, first to assume in a predetermined region of the field near the said bounding surface periodically varying velocities having the frequency of the field as a function of the time of entry into the space-resonant device, secondly, to cause the faster electrons to gain upon the slower electrons to cause the eletcrons to become concentrated in groups during their further travel in the field, and thirdly, to cause the groups to leave the field at another portion of the bounding surface with less energy than when the electrons entered the field, thereby to transfer energy to the field.*

*52. Apparatus of the character described having, in combination, a space-resonant device having an apertured wall, and means for passing an electron stream into the space-resonant device through the apertured wall to establish an oscillating resonant electromagnetic field in the space-resonant device, the dimension of the space-resonant device in the direction of travel of the electron stream and the resonant frequency of the field being so related to the velocity of the electron stream in the space-resonant device as to cause the electrons, when in the space-resonant device, first to assume periodically varying velocities as a function of the time of entry into the space-resonant device, secondly, to cause the faster electrons to gain upon the slower electrons to cause the electrons to become concentrated in groups within the space-resonant device, and thirdly, to cause the groups to leave the field with less energy than when the electrons entered the field, thereby to transfer energy to the field.*

*53. Apparatus of the character described having, in combination, a space-resonant device having an apertured wall, and means for passing an electron stream into the space-resonant device to establish an oscillating resonant electromagnetic field in the space-resonant device and then out of the field through the apertured wall, the dimension of the space-resonant device in the direction of travel of the electron stream and the resonant frequency of the field being so related to the velocity of the electron stream in the space-resonant device as to cause the electrons, when in the space-resonant device, first to assume periodically varying velocities as a function of the time of entry into the space-resonant device, secondly, to cause the faster electrons to gain upon the slower electrons to cause the electrons to become concentrated in groups within the space-resonant device, and thirdly, to cause the groups to leave the field through the apertured wall with less energy than when the electrons entered the field, thereby to transfer energy to the field.*

*54. Apparatus of the character described having, in combination, a space-resonant device, means for passing an electron stream into the space-resonant device to establish an oscillating resonant electromagnetic field in the space-resonant device, the dimension of the space-resonant device in the direction of travel of the electron stream and the resonant frequency of the field being so related to the velocity of the electron stream in the space-resonant device as to cause the electrons, when in the space-resonant device, first to assume periodically varying velocities as a function of the time of entry into the space-resonant device, secondly, to cause the faster electrons to gain upon the slower electrons to cause the electrons to become concentrated in groups within the space-resonant device, and thirdly, to cause the groups to leave the field with less energy than when the electrons entered the field, thereby to transfer energy to the field, and means for superimposing a non-oscillating electric field upon the electromagnetic field in the space-resonant device.*

*55. Apparatus of the character described having, in combination, a space-resonant device, means for passing an electron stream into the space-resonant device to establish an oscillating resonant electromagnetic field in the space-resonant device, the dimension of the space-resonant device in the direction of travel of the electron stream and the resonant frequency of the field being so related to the velocity of the electron stream in the space-resonant device as to cause the electrons, when in the space-resonant device, first to assume periodically varying velocities as a function of the time of entry into the space-resonant device, secondly, to cause the faster electrons to gain upon the slower electrons to cause the electrons to become concentrated in groups within the space-resonant device, and thirdly, to cause the groups to leave the field with less energy than when the electrons entered the field, thereby to transfer energy to the field, and means for superimposing upon the electromagnetic field in the space-resonant device a field of frequency different from the frequency of the electromagnetic field.*

*56. Apparatus of the character described having, in combination, a space-resonant device having an inner evacuated portion and a surrounding non-evacuated portion separated by a*

*dielectric boundary, and means for passing an electron stream into and through the evacuated portion of the space-resonant device to establish an oscillating resonant electromagnetic field in the space-resonant device, the dimension of the space-resonant device in the direction of travel of the electron stream and the resonant frequency of the field being so related to the velocity of the electron stream in the space-resonant device as to cause the electrons, when in the space-resonant device, first to assume periodically varying velocities, secondly, to cause the faster electrons to gain upon the slower electrons to cause the electrons to become concentrated in groups within the space-resonant device, and thirdly, to cause the groups to leave the field with less energy than when the electrons entered the field, thereby to transfer energy to the field.*

*57. Apparatus for generating alternating current energy having, in combination, a space-resonant device having a bounding surface, means for passing an electron stream through a portion of the bounding surface into the space-resonant device, said device being of such proportions and the electrons of said stream having such velocities that a resonant oscillating electric field is established in the space-resonant device to cause the electrons to assume in a predetermined region of the field near the said portion of the bounding surface periodically varying speeds of the frequency of the field, in the direction of travel of the electrons, thereby to cause the electrons to become concentrated in groups during their further travel in the field, and to cause the electron groups to leave the field at another portion of the bounding surface to cause the electrons of the groups to transfer energy to the field to sustain it is oscillation, and a conductor coupled to the field.*

*58. An electron discharge device having a tank circuit including a pair of concentric tubular members which, in combination, form a standing wave system, another tubular member coaxial with the inner of the two concentric tubular members and axially spaced therefrom to provide a gap between the members, said other member being electrically connected to the outer concentric member, means for projecting a stream of electrons axially of said tubular members across said gap, means for modulating said stream of electrons and means for collecting the electrons after passage through said tubular members.*

*59. Apparatus of the character described having, in combination, means for creating a confined standing electromagnetic field having an electric field portion extending in a predetermined region, means for confining the electric field portion to the region, and means for passing an electron stream through the electric field portion to cause the electrons to assume periodically varying velocities and to become concentrated in groups.*

*60. Apparatus of the character described having, in combination, means for creating an electron stream, means comprising a space-resonant device for periodically varying the velocity of the electrons of the stream, and means for adjusting the space-resonant device to adjust the period of the periodic variation of the said velocity.*

*61. Apparatus of the character described comprising an internally resonant hollow body having a reentrant pole provided with an opening, and a multiple-apertured conducting member closing the opening.*

*62. An electron velocity variation device comprising a space resonant chamber, means for projecting an electron beam entirely across the interior of said chamber from a region at one of the interior walls to a region at an opposite wall, the whole path of said beam between said regions being exposed to the alternating electromagnetic field within the chamber.*

*63. A velocity modulation system for operation at a predetermined frequency comprising a conductive structure providing a cavity resonator resonant at said predetermined frequency and including aligned openings defining a gap, a cathode positioned on one side of said resonator, electrode means in alignment with the openings in said resonator and cooperating with said cathode to direct a beam of electrons through said openings, said gap having a length greater than the average velocity of electrons traversing the gap divided by said frequency.*

*64. A velocity modulation system for operation at a predetermined frequency comprising a conductive structure providing a cavity resonator resonant at said predetermined frequency and including aligned openings defining a gap, a cathode positioned on one side of said resonator, electrode means in alignment with the openings in said resonator and cooperating with said cathode to direct a beam of electrons through said openings, the length of said gap being greater than the gap length corresponding to a transit angle of $2\pi$ radians at said frequency.*

*65. A velocity modulation system for operation at a predetermined frequency comprising a conductive structure providing a cavity resonator resonant at said predetermined frequency and including aligned openings defining a gap, a cathode positioned on one side of said resonator, electrode means in alignment with the openings in said resonator, means impressing a unidirectional component of voltage on said cathode and electrode means to direct a beam of electrons through said openings at a predetermined average velocity, the length of said gap being greater than the gap length corresponding to a transit angle of $2\pi$ radians at said frequency.*

FREDERICK B. LLEWELLYN.

REFERENCES CITED

The following references are of record in the file of this patent or the original patent:

UNITED STATES PATENTS

| Number | Name | Date |
|---|---|---|
| 2,107,387 | Potter | Feb. 8, 1938 |
| 2,114,114 | Roberts | Apr. 12, 1938 |
| 2,122,538 | Potter | July 5, 1938 |
| 2,163,589 | Dallenbach | June 27, 1939 |